United States Patent [19]
Schipper

[11] Patent Number: 5,983,159
[45] Date of Patent: Nov. 9, 1999

[54] LOCATION DETERMINATION USING SIGNALS FROM FEWER THAN FOUR SATELLITES

[75] Inventor: John F. Schipper, Palo Alto, Calif.

[73] Assignee: Trimble Navigation, Sunnyvale, Calif.

[21] Appl. No.: 08/940,709

[22] Filed: Sep. 30, 1997

[51] Int. Cl.$^6$ .................................................. G01C 21/00
[52] U.S. Cl. ............................................................ 701/213
[58] Field of Search ........................ 701/213; 342/357.12

[56] References Cited

U.S. PATENT DOCUMENTS 5,563,917   10/1996   Sheynblat .................................. 375/346

OTHER PUBLICATIONS

W.H. Guier and G.C. Weiffenbach, "A Satellite Doppler Navigation System," pp. 507–516, Proceedings of the IRE, Apr. 1960.

W.P. Williams, "Marine Satellite Navigation Systems," pp. 50–54, SERT Journal vol. 13, Mar. 1977.

Theodore Wyatt, "The Gestation of Transit as Perceived by One Participant," pp. 32–38, Johns Hopkins APL Technical Digest, vol. 2, No. 1, 1981.

W.F. Blanchard, "The Continuing Development of 'Transit'," pp. 189–199, IEE Special Conference on Mobile Communication and Navigation, 1983.

Keith R. Symon, "Mechanics," pp. 110–113, Addison–Wesley, 1953.

*Primary Examiner*—Gregory C. Issing
*Attorney, Agent, or Firm*—John Schipper

[57] ABSTRACT

Method and apparatus for determining the location of a point on a rotating body, using location determination (LD) signals received from as few as one satellite, preferably non-geosynchronous. Where signals from two or more satellites are received, one may be geosynchronous. Pseudoranges are measured from one or more satellites at two or more selected, spaced apart observation times, and the simultaneous rotations of the body and the satellite(s) relative to each other result in different body-satellite constellations for which the initial location coordinates (and, optionally, signal receiver time offset) of the selected point are determined exactly, without approximation or iteration. The selected point may be motionless or may be allowed to move with known coordinate differences between the initial unknown location and the present location at each observation time. Pseudoranges from different satellites, or even from different satellite systems (GPS, GLONASS, LEO, etc.) can be measured and used in this procedure.

28 Claims, 2 Drawing Sheets

LOCATION DETERMINATION USING SIGNALS FROM FEWER THAN FOUR SATELLITES

FIELD OF THE INVENTION

This invention relates to determination of location coordinates and/or time coordinate for a user that receives timed signals from fewer than four satellites.

BACKGROUND OF THE INVENTION

Timed signals received by a receiver/processor from satellites are now routinely used to determine location coordinates and/or receiver time offset of the receiver. Two examples of this are the signals received as part of a Global Positioning System (GPS), signals received as part of a Global Orbiting Navigational Satellite System (GLONASS), and signals received as part of a Low Earth Orbit (LEO) system, such as the 66-satellite Iridium constellation proposed by Motorola.

One potential problem here is that the minimum number of satellites needed for determination of location coordinates alone (usually two or three) or for determination of location coordinates and receiver time offset (four) may not be in view simultaneously. A related problem occurs for an extraterrestrial exploration vehicle, such as the landing vehicle for the Mars Explorer that touched down on that planet's surface on or around Jul. 3, 1997, wherein only a single satellite, the mother ship orbiting the planet, is available to provide timed signals for location determination.

The U.S. Navy Navigation Satellite System, also known as "Transit," used triangulation from signals received from a plurality of satellites with orbits in polar planes to estimate a user's location. Development of the Transit system began at Johns Hopkins in 1958, became partly operational in 1963 and became fully operational in 1968. The Transit system included at least six satellites, arranged in polar orbits (angle of inclination relative to the equator=90°), with altitudes of about 1075 kilometers (km) above the Earth's surface with orbit time intervals of 107 minutes. The six orbits formed a "bird cage" constellation around the Earth. The average time between usable satellite passes was about 90 minutes, but the actual time can vary between 30 minutes and several hours, depending upon the observer's location.

Each satellite transmitted signals at each of two frequencies, 150 MHz and 400 MHz, with a frequency stability of about 1 part in $10^{11}$. The transmitted signal includes a navigation message that is repeated every two minutes. The navigation message itself was updated every 12 hours but could run for up to 16 hours without requiring an update. The Transit ground support system included four tracking stations within the U.S., plus two signal injection stations to inject navigation message updates and a computer center that created the message update. The navigation message included a fixed part with geometrical parameters that describe a perfectly smooth elliptical orbit and a variable part that provides corrections to the elliptical orbit parameters; every two minutes, a new orbital correction is added and an older correction is deleted.

The signal frequency transmitted at 400 MHz (nominal) by each Transit satellite was offset by 32 kHz to provide a relatively low frequency difference (32 kHz±8 kHz) after mixing the received signal ($f=F_G$) with a 400 MHz signal ($f=F_R$) at a ground station. The distance or slant range of a given Transit satellite from a ground-based user was determined using a carrier phase count of the number of full and partial cycles N received between two selected time markers t1 and t2, viz.

$$N=(F_G-F_R)dt=(F_G-F_R)(t2-t1)+F_G(R2-R1)/c, \quad (1)$$

where R1 and R2 are the as-yet-unknown distances of the satellite from the user at the beginning and end of the integration interval, respectively. The change in slant range, R2-R1, was determined from the Doppler shift change, represented by the last term in Eq. (1). Each full count ($\Delta N=1$) of a carrier phase signal represents about 0.75 meters. Two frequencies, 150 MHz and 400 MHz, were used to estimate the time delay due to signal propagation in the ionosphere. Time delay due to signal propagation in the troposphere and due to refraction was estimated as a unit. For this dual frequency set, the estimated maximum radial error and rms radial error for location using the Transit system are about 77 meters and 32 meters, respectively. A computer uses a least square error approach to estimate the best fit of location, based upon the Doppler shift signals determined for each of the two or three visible satellites. If the user moves during the time interval of receipt of the signals transmitted by the satellites, the system requires accurate specification of the velocity vector during this interval and usually relies upon dead reckoning between location fixes.

The Transit system is discussed by Gueir and Weiffenbach, "A Satellite Doppler Navigation System", Proc. I.R.E. (1960) pp. 507–516, and by Williams, "Marine Satellite Navigation Systems", SERT Journal, vol. 13 (1977) pp. 50–54.

The Transit system required fixed inclination angles for each of a collection of satellites, used a least square error approach, rather than an exact analytical approach, to determine user location, did not explicitly account for the rotation of the Earth, relying instead on simultaneous visibility of two or three satellites, and relied upon dead reckoning to determine user location between location fixes.

What is needed is an approach that allows receipt and analysis of fewer (as few as one) than the theoretical minimum number of (simultaneous) satellite signals needed, to determine the location coordinates and/or receiver time offset (referred to collectively here as "location fix coordinates") for a receiver. Preferably, the approach should be flexible and should allow (1) receipt and analysis of signals from as few as a single satellite and (2) receipt and analysis of signals from satellites that are part of different location determination (LD) systems ("mixed system signals"), such as a mixture of GPS and LEO signals or a mixture of GPS and GLONASS signals.

SUMMARY OF THE INVENTION

The invention meets these needs by providing methods that can receive and analyze signals from a single satellite, or from more than one satellite, at spaced apart times, by taking advantage of the rotation of a planet or planetary satellite (referred to collectively here as a "planet") and of the separate rotation of the signal-transmitting satellite(s) relative to the planet. The rotational axis and angular rotation for the planet and the rotational axis and angular rotation for the satellite are assumed to be determinable or known. Movement of the satellite relative to the receiver (which is also spinning below, on or near the planet's surface) is described parametrically in time, where the only unknowns are the location coordinates of the receiver at a selected time. An equation describing the orbit of each satellite used for LD is assumed to be known or determinable. An equation describing the distance or pseudorange between the receiver and each of one or more satellites used for LD is nonlinear in the unknown location fix coordinates. Assuming that associated errors such as ionospheric propagation time delay, tropospheric propagation time delay, receiver noise, satellite transmitter time offset and multipath propagation can be measured or modeled and compensated for, as is done in conventional LD systems, these nonlinear equations are analyzed exactly (no approximations or iterations) and are reduced to a sequence of exact equations linear in the unknown location fix coordinates. These linear equations, plus one nonlinear equation, are used to determine the user's location coordinates, for a stationary user or for a user that moves along a known path relative to an unknown initial location.

The LD signals may be received and analyzed from one or more satellites belonging to a single LD system, such as GPS, GLONASS or LEO. Alternatively, the LD signals may be received and analyzed from two or more different LD systems, as long as (1) the orbit of each satellite from which LD signals are received is known and (2) timed LD signals received from a satellite can be distinguished and assigned to the source of those signals. One advantage of use of timed signals from a single satellite for LD is that no special orthogonality or frequency distinction need be built into these signals to distinguish one signal source from another signal source, as is required, for example, in a CDMA system.

The receiver may be assumed to be stationary while the LD signals are being received. Alternatively, the receiver may be allowed to move along a known path relative to its initial unknown location.

DESCRIPTION OF BEST MODES OF THE INVENTION

Figure 1:
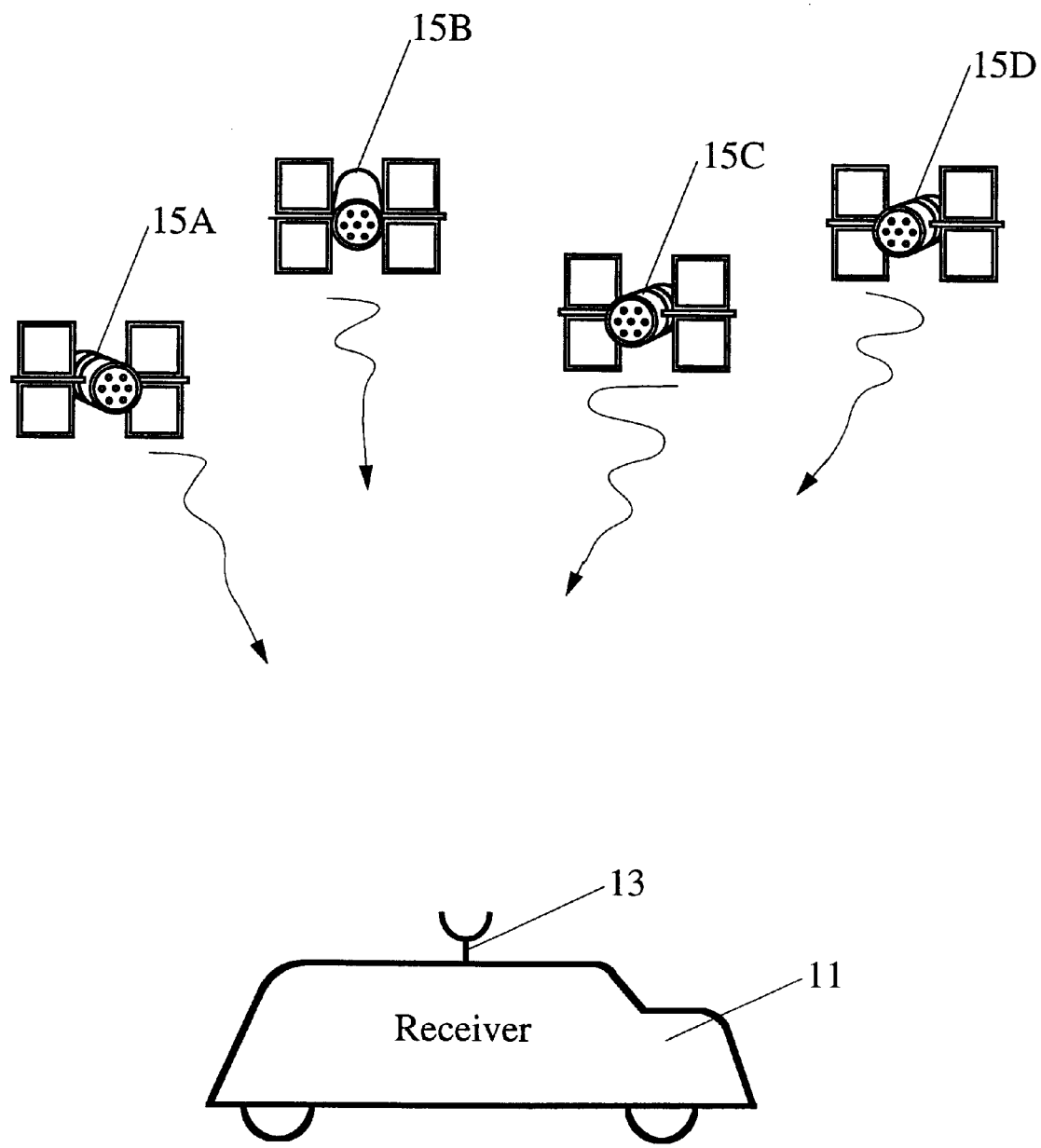
FIG. 1 illustrates practice of the invention in one embodiment.

In FIG. 1, an LD signal receiver/processor 11 and associated LD signal antenna 13, which are part of a LD system, receive LD signals from one, two or more LD signal sources 15A, 15B, 15C, 15D that are visible (by line-of-sight view) from the LD antenna 13. Each LD signal received by the LD receiver/processor 13 from an LD signal source 15s (s=A, B, C, D) is a timed signal, preferably but not necessarily a CDMA signal or other signal that changes in a determinable manner with time (a "time-determined" signal). When a particular portion of an LD signal sequence is received at the receiver/processor 11, this portion is analyzed, and the time at which this portion of the LD signal was transmitted by the LD signal source 15s is determined. Two signals transmitted by two different LD signal sources 15s and 15s' are distinguishable. Thus, the time $\Delta t(15s;rcvr)$ required for propagation of an LD signal, transmitted from an identified LD source 15s and received by the LD antenna 13 or the LD receiver/processor 11 is readily determined. This invention does not require that the propagation times $\Delta t(15s;rcvr)$ (s=A, B, C and D) from four or more distinct LD signal sources be simultaneously available. The situation where LD signals from only a single satellite are received at a stationary receiver is considered first.

Figure 2:
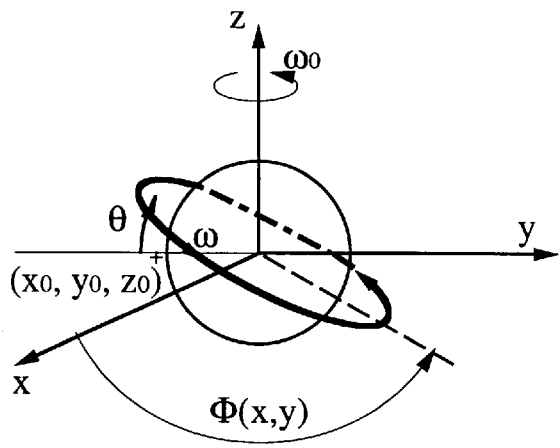
FIG. 2 illustrates rotation of an LD signal source (satellite) and receiver relative to each other.

Assume that a single satellite orbits about a rotating planetary body in an orbital plane with an associated azimuthal angle $\Phi$ and an associated polar angle $\theta$, as illustrated in FIG. 2. The orbital plane is described in an (x,y,z) Cartesian coordinate system, with origin at the body center, by the parametric equation $$x\cos\Phi\cos\theta + y\sin\Phi\cos\theta + z\sin\theta = d, \quad (2)$$

where d is the perpendicular distance from the orbital plane to the center C of the planetary body. No loss of generality occurs by assuming that d=0, in which event the orbital plane contains the center C of the planetary body. The parametric equations for motion in time (t) of the satellite in the orbital plane are $$x_s(t) = a\cos\Phi\cos\omega(t-\tau 0) + a\sin\Phi\sin\omega(t-\tau 0), \quad (3)$$

$$y_s(t) = -a\sin\Phi\cos\theta\cos\omega(t-\tau 0) + a\cos\Phi\cos\theta\sin\omega(t-\tau 0) + z\sin\theta, \quad (4)$$

$$z_s(t) = a\sin\Phi\sin\theta\cos\omega(t-\tau 0) - a\cos\Phi\sin\theta\sin\omega(t-\tau 0) + z\cos\theta, \quad (5)$$

where a is the radius of the orbit (assumed to be circular here, but this is extended to elliptical orbits in the following), $\omega$ is the observed angular velocity associated with the orbit of the satellite, and $t=\tau 0$ is a selected time for the satellite orbit.

The satellite is assumed to transmit a time-determined message or sequence of digital values, but this message need not be a CDMA format signal, such as used for GPS signals, unless more than one satellite is present and transmitting such signals at the same carrier frequency and at substantially the same time. The planetary body has a nominal radius a0 and rotates around a known axis with angular velocity $\omega 0$. A digital signal receiver positioned on or near the surface of the planetary body is assumed to have a replica of the satellite transmitted message and is assumed to be provided with the values of the parameters $\Phi$, $\theta$, a, $\omega$, a0 and $\omega 0$. A point with as-yet unknown Cartesian coordinates (x0,y0,z0) that is fixed on or near the surface of the rotating planetary body is thus describable by the parametric equations $$x(t)=x0\cos\omega 0(t-t0)+y0\sin\omega 0(t-t0), \quad (6)$$

$$y(t)=-x0\sin\omega 0(t-t0)+y0\cos\omega(t-t0), \quad (7)$$

$$z(t)=z0, \quad (8)$$

where the time t=t0 is an arbitrary system initialization time.

It is assumed here that the ionospheric time delay, tropospheric time delay, multipath time deviation and receiver noise errors are modeled and removed or otherwise compensated for, as is done in a standard GPS signal analysis. The compensated pseudorange PR(t;t0;j) measured at the receiver, based on the received satellite signal (j), is represented mathematically as $$PR(t;t0;j)=b+\{(x_s(t;j)-x(t))^2+(y_s(t;j)-y(t))^2+(z_s(t;j)-z(t))^2\}^{1/2}, \quad (9)$$

where $b=c.\Delta t$ is a length equivalent of an unknown time offset of the receiver and c is the velocity of light in the medium. Pseudorange is measured at each of four or more distinct observation times $t=t_m$ and $t=t_n$ (m, n=1, 2, 3, 4; m<n) for satellite numbers j1 and j2, respectively, with t1<t2<t3<t4, and the following differences are formed.

$$(PR(t_m; t0; j1) - b)^2 - (PR; t_n; t0; j2) - b)^2 = \qquad (10)$$
$$Pr(t_m; t0; j1)^2 - PR(t_n; t0; j2)^2 -$$
$$2b\{PR(t_m; t0; j1) - PR(t_n; t0; j2)\} =$$
$$Amn + Bmn \cdot b = Cmn + Dmn \cdot x0 + Emn \cdot y0 + Fmn \cdot z0$$

$$Amn = PR(t_m; t0; j1)^2 - PR(t_n; t0; j2)^2, \qquad (11)$$

$$Bmn = 2\{PR(t_n; t0; j2) - PR(t_m; t0; j1)\} \qquad (12)$$

$$Cmn = r_s(t_m; j1)^2 - r_s(t_n j2)^2 = x_s(t_m; j1)^2 + y_s(t_m; j1)^2 + \qquad (13)$$
$$z_s(t_m; j1)^2 - x_s(t_n; j2)^2 - y_s(t_n; j2)^2 - z_s(t_n; j2)^2,$$

$$Dmn = 2\{x_s(t_{s,n}; j2)\cos\omega 0(t_n - t0) - x_s(t_{s,m}; j1)\cos\omega 0(t_m - t0) + \qquad (14)$$
$$y_s(t_{s,m}; j1)\sin\omega 0(t_m - t0) - y_s(t_{s,n}; j2)\sin\omega 0(t_n - t0)\},$$

$$Emn = 2\{x_s(t_{s,n}; j2)\sin\omega 0(t_n - t0) - x_s(t_{s,m}; j1)\sin\omega 0(t_m - t0) + \qquad (15)$$
$$y_s(t_{s,n}; j2)\cos\omega 0(t_n - t0) - y_s(t_{s,m}; j1)\cos\omega 0(t_m - t0)\},$$

$$Fmn = 2\{z_s(t_{s,n}; j2) - z_s(t_{s,m}; j1)\}, \qquad (16)$$

The notation adopted in Eqs. (10)–(16) applies to signals received from two different satellites (j1≠j2) and to signals received from the same satellite (j1=j2). One or both of the observation times may, if desired, coincide with the time t0. The satellite coordinates $(x_s(t),y_s(t),z_s(t))$ for the times $t=t_m$ and $t=t_n$ need not refer to the same satellite, or even to two or more satellites within the same system of satellites (e.g., all GPS or all GLONASS or all LEO), as long as the satellite coordinates are accurately known. Thus, different satellites with known coordinates can be used to determine the coefficients Dmn, Emn and Fmn for different indices n.

First consider the situation where signals are received from a single satellite (j1=j2), at two different observation times. Three difference equations (10), formed using the four times $t_m, t_n$=t1, t2, t3, and t4 ($t_m \neq t_n$), produce three linear equations in the four unknowns x0, y0, z0 and b. These three linear difference equations are expressible in the form $$H(1; 2, 3, 4)X = A - C + B \cdot b, \qquad (17)$$

$$H = \begin{bmatrix} D12 & E12 & F12 \\ D13 & E13 & F13 \\ D14 & E14 & F14 \end{bmatrix} \qquad (18)$$

$$X = \begin{bmatrix} x0 \\ y0 \\ z0 \end{bmatrix} \qquad (19)$$

$$A - C = \begin{bmatrix} A12 - C12 \\ A13 - C13 \\ A14 - C14 \end{bmatrix} \qquad (20)$$

$$B = \begin{bmatrix} B12 \\ B13 \\ B14 \end{bmatrix}. \qquad (21)$$

The matrix entries Dmn, Emn and Fmn are interpretable as x, y and z location coordinate differences resulting from rotating the respective locations given by $(x_s(t_{s,n}),y_s(t_{s,n}),z_s(t_{s,n}))$ and $(x_s(t_{s,m}),y_s(t_{s,m}),z_s(t_{s,m}))$ around the planet axis according to the respective rotation matrices $$Rk = \begin{bmatrix} \cos\omega 0(t_k - t0) & \sin\omega 0(t_k - t0) & 0 \\ -\sin\omega 0(t_k - t0) & \cos\omega 0(t_k - t0) & 0 \\ 0 & 0 & 1 \end{bmatrix} \quad (k = n, m). \qquad (22)$$

Requiring that the determinant of the matrix H(1;2,3,4) be non-zero is equivalent to requiring that the four sets of rotated location coordinates $$Rk \begin{bmatrix} x_s(t_k) \\ y_s(t_k) \\ z_s(t_k) \end{bmatrix} \quad (k = 1, 2, 3, 4) \qquad (23)$$

be non-coplanar. The satellite is acted upon primarily by a central force potential that depends only upon the radial distance between the planet center and the satellite. The non-coplanarity condition is satisfied for the four sets of rotated location coordinates for most choices of the distinct observation times t=t1, t2, t3 and t4. An exception occurs if the satellite orbit lies in a plane that is parallel to the equatorial plane of the planetary body, or if all satellites are geosynchronous.

The determinant of the matrix H(1;2,3,4) is thus non-zero, and the inverse matrix $H(1;2,3,4)^{-1}$ exists and is computable by well known procedures. Equation (16) is thus invertible and yields the partial solution $$X = H(1;2,3,4)^{-1}\{A - C + B \cdot b\} \qquad (24)$$

expressing the spatial location coordinates x0, y0 and z0 in terms of the time offset b. This approach also works where one or more location fix coordinates x0, y0, z0 and b is known, by substituting known values. A fourth equation, expressible in terms of only the remaining unknown (here, b) is obtained by squaring Eq. (9) for one of the selected observation times to obtain a quadratic equation in the remaining unknown, such as b, viz.

$$(PR(t_n;t0) - b)^2 = (x_s(t_{s,n}) - x(t_n))^2 + (y_s(t_{s,n}) - y(t_n))^2 + (z_s(t_{s,n}) - z(t_n))^2. \quad (25)$$

Here, three of the four unknown parameters x0, y0, z0 and b are replaced by their linear relationship in terms of the fourth unknown parameter, using Eq. (17) or (24).

The quadratic equation (25) in the fourth unknown (for example, b) has two roots, one of which will have a physically realistic small magnitude (of the order of microseconds or milliseconds). This physically realistic value of b is then substituted into the three difference equations (10) or the matrix equation (24), and the values for the remaining unknowns x0, y0 and z0 are determined. Because measurements at only four times are used, the solutions for the unknowns x0, y0, z0 and b should be internally consistent for this set of measurements. Any one of the four location fix coordinates x0, y0, z0 and b can be used as the "fourth" unknown, although it is most convenient to use b because the physically realistic value of b is relatively small, of the order of 10–10,000 cm or less.

Alternatively, four difference equations (10) can be formed using five distinct times $t_m$, $t_n$=t1, t2, t3, t4 and t5 ($t_m \neq t_n$), and the solutions for the four unknowns x0, y0, z0 and b can be determined from the resulting linear equations. An advantage of this alternative is that only linear equations are analyzed. Possible disadvantages of this alternative are that (1) five measurements instead of four must be made and (2) the solutions for the four unknowns may not be internally consistent among the measurements at the five distinct measurement times.

The solution obtained above uses compensated pseudorange values measured at four different times, preferably separated by several minutes to a few hours to obtain a more favorable constellation or configuration of the satellite at the four observation points. As the satellite moves in a first orbit across the sky, the receiver location (x0,y0,z0) will move in another orbit around the body's axis. This joint motion of the satellite location and the receiver location should produce four non-coplanar locations in space for the four pseudorange observations. An exception occurs when the orbital plane for the satellite is substantially parallel to, or coincides with, the equatorial plane of the planetary body. This exception does not occur for the GPS satellites orbiting the Earth and is very unlikely to occur for a "mother ship" orbiting a planetary body, such as Mars.

The above development allows determination of the location of a fixed receiver on the surface of a planetary body, such as Mars or Earth, where the orbit parameters of a single satellite are known and the compensated pseudorange for the satellite can be measured at four distinct times. If the receiver time offset is unimportant, only three distinct observation times are used.

The above formalism extends to observation of compensated pseudoranges for one, two, three or four distinct satellites at distinct times. This extends the GPS analysis to situations where fewer than four satellites are observable; this also allows a pseudorange measurement for a first satellite to be used with a second pseudorange measurement for a second satellite at a second time, with a third pseudorange measurement for a third satellite at a third time, and/or with a fourth pseudorange measurement for a fourth satellite at a fourth time, if the same satellite cannot be observed at all four times. Further, LD signals from different LD systems can be used to determine location according to the invention, using a "mixed system." For example, one or more LD signals received from GPS signal sources can be used together with one or more LD signals received from GLONASS or LEO signal sources.

Consider next the situation where signals are received from two different satellites (j1≠j2) at the same time $t_m=t_n$ (=t0 optionally). The formalism set forth in Eqs. (10)–(16) is applicable here as well, with $t_m=t_n=t0$. Equations (10)–(13) and (16) are unchanged, and Eqs. (14) and (15) simplify to $$Dmn = 2\{x_s(t_{s,n};j2) - x_s(t_{s,m};j1)\}, \quad (14')$$

$$Emn = 2\{y_s(t_{s,n};j2) - y_s(t_{s,m};j1)\}. \quad (15')$$

The resulting equations (17)–(25) are formally unchanged, although the coefficients Dmn and Emn for the difference in Eq. (10) will computed differently for two signals from the same satellite measured at different times (j1=j2; $t_m \neq t_n$) and for two signals measured at the same time from different satellites (j1≠j2; $t_m=t_n=t0$).

In the remaining situation, one satellite signal (j=j1) in the difference formed in Eq. (10) is measured at $t=t_m=t0$ and the other satellite signal (j=j2≠j1) in the difference is measured at a time $t=t_n$, which may be the same as, or different from, the time t=t0. In this situation, Eqs. (10)–(13) and (16) are unchanged and Eqs. (14) and (15) simplify to $$Dmn = 2[x_s(t_{s,n}; j2)\cos\omega 0(t_n - t0) - \quad (14'')$$
$$y_s(t_{s,n}; j2)\sin\omega 0(t_n - t0) - x_s(t_{s,m}; j1)]$$

$$Emn = 2[x_s(t_{s,n}; j2)\sin\omega 0(t_n - t0) - \quad (15'')$$
$$y_s(t_{s,n}; j1)\cos\omega 0(t_n - t0) - y_s(t_{s,m}; j1)]$$

Again, the resulting equations (17)–(25) are formally unchanged.

The preceding discussions cover the physically possible situations for formation of the difference of the pseudorange squares in Eq. (10): (1) observation of a single satellite pseudorange at two, three or four distinct times; (2) observation of a first satellite pseudorange at one, two or three distinct times and observation of a second satellite pseudorange at a selected time, where the second satellite observation time may, but need not, coincide with one of the observation times for the first satellite; (3) observation of a first satellite pseudorange at N distinct times and observation of a second satellite pseudorange at M-N distinct times (M≧N+1; N=1,2,3), where any one of the second satellite observation times may, but need not coincide with any one of the observation times for the first satellite; (4) observation of a first satellite pseudorange at first and second distinct times and observation of a second satellite pseudorange at third and fourth distinct times, where one of the third and fourth times may, but need not, coincide with at least one of the first and second times; (5) observation of a first satellite pseudorange at a first time, observation of a second satellite pseudorange at a second time and observation of a third satellite pseudorange at third and fourth distinct times, where the first time and/or the second time may, but need not, coincide with at least one of the third time and fourth times; and (6) observation of a first satellite pseudorange at a first time, observation of a second satellite pseudorange at a second time, observation of a third satellite pseudorange at a third time and observation of a fourth satellite pseudorange at a fourth time, where two or more of the first, second, third and fourth times may, but need not coincide.

Table 1 sets forth non-equivalent possibilities for use of LD signals received from one, two, three or four distinct satellites, indicated as a, b, c, d in column three, for four time values t1, t2, t3, t4 satisfying t1≦t2≦t3≦t4.

TABLE 1

Satellite signal assignments

| Time sequence | No. of satellites | Satellite signals received |
|---|---|---|
| t1 = t2 = t3 = t4 | 4 | a,b,c,d (at times t1, t2, t3, t4, respectively) |
| t1 < t2 = t3 = t4 | 3, 4 | a,a,b,c a,b,c,d |
| t1 = t2 < t3 = t4 | 2, 3, 4 | a,b,a,b a,b,b,c a,b,a,c a,b,c,d |
| t1 = t2 = t3 < t4 | 3, 4 | a,b,c,a a,b,c,d |
| t1 < t2 < t3 = t4 | 2, 3, 4 | a,a,a,b a,b,a,b a,a,b,c a,b,a,c a,b,c,a a,b,c,d |
| t1 < t2 = t3 < t4 | 2, 3, 4 | a,a,b,a a,a,b,b a,a,b,c a,b,c,a a,b,c,b a,b,c,c a,b,c,d |
| t1 = t2 < t3 < t4 | 2, 3, 4 | a,b,a,a a,b,a,b a,b,b,a a,b,b,b a,b,a,c a,b,b,c a,b,c,d |
| t1 < t2 < t3 < t4 | 1, 2, 3, 4 | a,a,a,a a,a,a,b a,a,b,a a,a,b,b a,a,b,c a,b,a,a a,a,b,b a,a,b,b a,a,b,b,a a,b,a,c a,b,c,a a,b,b,c a,b,c,b a,b,c,c a,b,b,b a,b,c,d |

The eight time sequences in column 1 divide naturally into four subgroups of sizes one, three, three and one, as indicated, although the number of possibilities for satellite signals received in column 3 is not necessarily the same for each member of a subgroup. The time-ordered sets of satellite signals set forth in column 3 of Table 1 may not exhaust the possibilities but are included to illustrate the possibilities of use of signals received from one, two, three or four distinct satellites.

Receipt of signals from two distinct satellites at "simultaneous" times, indicated by a partial time sequence such as t1=t2, is to be interpreted here as covering receipt of these signals from the two satellites "a" and "b" within a few hundred milliseconds, or less, of each other. In theory, receipt of signals, from either the same satellite or from two distinct satellites, at two non-simultaneous times, indicated by a partial time sequence such as t1<t2, can theoretically occur at two times t1 and t2 that are at least a few hundred milliseconds apart. In practice, however, two non-simultaneous times t1 and t2 are preferably at least a few minutes apart in order to provide an adequate constellation for the two, three or four locations of the satellite(s) used to provide the pseudorange values for the computations set forth in the preceding development.

The number of pseudorange measurements required here will depend upon the number of location fix coordinates (x0,y0,z0,b) that are required for the situation. If, for example, K of these location fix coordinates (K=1,2,3) are already known, 4-K independent pseudorange measurements are needed to determine the remaining 4-K unknown location fix coordinates. These 4-K pseudorange measurements may be made using a single satellite or any larger number of satellites, up to 4-K.

Figure 3:
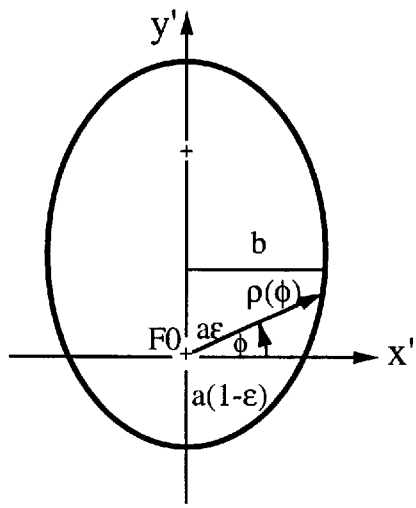
FIG. 3 illustrates an elliptical satellite orbit.

The orbit(s) of the satellite(s), assumed to be circular in Eqs. (3)–(5), may be extended to an elliptical orbit, illustrated in FIG. 3, by the following development. The ellipse has a semi-major axis (x') of length a, a semi-minor axis (parallel to y') of length b, and an eccentricity given by $$\epsilon = \{1 - b^2/a^2\}^{1/2}, \quad (26)$$

where b<a. The radius length p of a line segment from an ellipse focus F0 to its intersection with the ellipse curve is given by $$\rho(\phi) = a(1-\epsilon^2)/(1+\epsilon \cos(\phi+\pi/2)), \quad (27)$$

where $\phi$ is the angle the line segment makes with the y'-axis in FIG. 3. (K. R. Symon, *Mechanics*, Addison Wesley, Cambridge, Mass., 1953, pp. 111–114). Note that the azimuthal angle $\phi$ is defined with reference to the x'-axis rather than to the more conventional y'-axis. The analogues of Eqs. (3)–(5) for an elliptical orbit, instead of a circular orbit, are verified to be $$x_s(t;j) = \rho(\phi)\cos\Phi \cos\omega(t-\tau 0) + \rho(\phi)\sin\Phi \sin\omega(t-\tau 0), \quad (28)$$

$$y_s(t;j) = -\rho(\phi)\sin\Phi \cos\theta \cos\omega(t-\tau 0) + \rho(\phi)\cos\Phi \cos\theta \sin\omega(t-\tau 0) + z\sin\theta, \quad (29)$$

$$z_s(t;j) = \rho(\phi)\sin\Phi \sin\theta \cos\omega(t-\tau 0) - \rho(\phi)\cos\Phi \sin\theta \sin\omega(t-\tau 0) + z\cos\theta, \quad (30)$$

where the planetary body is located at an ellipse focus F0 (FIG. 3).

Thus far, the LD signal receiver is assumed to be motionless, or nearly so, during a continuous time interval including the observation times t=t1, t2, t3 and t4. The LD signal receiver is now allowed to move along an arbitrary path P, where the initial spatial location coordinates (x0,y0,z0) are unknown but the differential location coordinates $(\Delta x0'(t_n), \Delta y0'(t_n), \Delta z0'(t_n))$ of the receiver relative to this initial location at an earlier or later time $t=t_n$ are known (n=1, 2, 3, 4). If Eqs. (6), (7) and (8) are redeveloped for the time $t=t_n$, it is easily verified that these relations take the alternate forms $$x(t_n) = (x0 + \Delta x0'(t_n))\cos\omega 0(t_n - t0) + (y0 + \Delta y0'(t_n))\sin\omega 0(t_n - t0), \quad (31)$$

$$y(t_n) = -(x0 + \Delta x0'(t_n))\sin\omega 0(t_n - t0) + (y0 + \Delta y0'(t_n))\cos\omega 0(t_n - t0), \quad (32)$$

$$z(t_n) = z0 + \Delta z0'(t_n), \quad (33)$$

where $\Delta x0'(t_n)$, $\Delta y0'(t_n)$ and $\Delta z0'(t_n)$ are known. One verifies that, with the indicated changes made in the observed location coordinates $(x0+\Delta x0'(t_n), y0+\Delta y0'(t_n), z0+\Delta z0'(t_n))$, Eq. (17) assumes the alternate form $$H(1;2,3,4)X = A - C - \Delta X0' + B \cdot b, \quad (34)$$

$$\Delta X0' = \begin{bmatrix} \Delta X(t1,t2) \\ \Delta X(t1,t3) \\ \Delta X(t1,t4) \end{bmatrix}, \quad (35)$$

$$\Delta X(t_m, t_n) = 2\{x_s(t_{s,n})\Delta x0'(t_n)\cos\omega 0(t_n - t0) - \quad (36)$$
$$x_s(t_{s,m})\Delta x0'(t_m)\cos\omega 0(t_m - t0) +$$
$$y_s(t_{s,m})\Delta x0'(t_m)\sin\omega 0(t_m - t0) -$$
$$y_s(t_{s,m})\Delta x0'(t_n)\sin\omega 0(t_n - t0)\} +$$
$$x_s(t_{s,n})\Delta y0'(t_n)\sin\omega 0(t_n - t0) -$$
$$x_s(t_{s,n})\Delta y0'(t_m)\sin\omega 0(t_m - t0) +$$
$$y_s(t_{s,n})\Delta y0'(t_m)\cos\omega 0(t_m - t0) -$$
$$y_s(t_{s,n})\Delta y0'(t_n)\cos\omega 0(t_n - t0) +$$
$$x_s(t_{s,n})\Delta y0'(t_n)\cos\omega 0(t_n - t0) +$$
$$z_s(t_{s,n})\Delta z0'(t_n) - z_s(t_{s,n})\Delta z0'(t_m)\}.$$

The analogue of Eqs. (17) and (24) become, respectively, $$H(1,2,3,4)X = A - C - \Delta X0' + B \cdot b\}, \quad (37)$$

$$X = H(1;2,3,4)^{-1}\{A - C - \Delta X0' + B \cdot b\}, \quad (38)$$

and Eq. (25) is unchanged, except that the location coordinates (x(t),y(t),z(t)) now become (x0+$\Delta$x0'(t), y0+$\Delta$y0'(t), z0+$\Delta$z0'(t)) in Eq. (25).

Allowing the initial unknown receiver coordinates (x0, y0,z0) to change by known amounts ($\Delta$x0'(t), $\Delta$y0'(t), $\Delta$z0' (t)) relative to an initially unknown location at subsequent times will be useful in surveying activities, or where a particular satellite cannot be observed at a particular time because of blockage by canyon walls, trees, buildings or other structures. Note that the path P by which the receiver arrived at a subsequent location with coordinates (x0+$\Delta$x0' (t), y0+$\Delta$y0'(t), z0+$\Delta$z0'(t)) is not important: only the coordinates at the observation times t=t1, t2, t3, t4 are involved in the solution of Eqs. (34), (35), (36), (37) and (38).

The LD receiver/processor 11 in FIG. 1 identifies the LD signal source and measures or otherwise determines a pseudorange from the LD signal source to the LD antenna 13, based on signal propagation time or another suitable measurement. A pseudorange is an approximate distance from an LD signal source, which transmits an LD signal, to an LD signal antenna, which subsequently receives the LD signal, and is usually based upon LD signal propagation time. For this purpose, the LD signal is often a time-determined signal, (1) with numerous time reference indicia included in the signal to allow quantitative determination of what portion of the signal is presently being received, and (2) with different indicia that are part of the signal being transmitted at specified times by the LD signal source. A "raw" pseudorange measurement, based on a signal transmitted from a satellite (j) and received by an LD receiver (i), often includes errors from one or more of the following artifacts: (1) time delay $\tau_I(t;i;j)$ (over and above the normal time delay due to signal propagation at the speed of light in vacuum) due to signal propagation in the ionosphere; (2) time delay $\tau_T(t;i;j)$ due to signal propagation in the troposphere; (3) satellite transmitter time offset SCB(t;j); (4) receiver noise $\eta(t;i,j)$; (5) receiver time offset RCB(t;i); and (6) receipt of multipath signals m(t;i;j) at the receiver antenna. It is assumed here that most or all of these errors, except possibly receiver time offset, are modeled and removed or otherwise compensated for from the measured pseudorange.

The measured pseudorange signal is expressed in equivalent length units as $$PR(t;i,j)=R(t;i,j)+SCB(t;j)+RCB(t;i)+\tau_T(t;i,j)+\tau_I(t;i,j)+m(t;i;j)+\eta(t;i;j), \quad (39)$$

where R(t;i;j) represents the "true" range from the receiver number i to the satellite number j at the time t, as determined from navigation ephemeris (or almanac information) that is available at, or received by, receiver number i.

Figure 4:
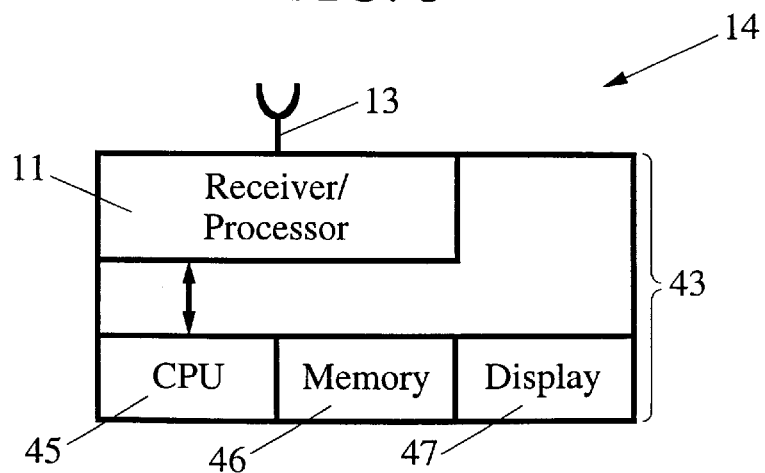
FIG. 4 is a schematic view of apparatus for practicing the invention.

FIG. 4 is a schematic view of LD signal apparatus 41 suitable for practice of the invention. An LD signal antenna 13 receives one or more LD signals from one or more LD signal sources (not shown) and passes this signal(s) to an LD signal receiver/processor 11 that is part of a computer 43. The computer 43 (or the receiver/processor 11) measures or otherwise determines a pseudorange associated with the presently received LD signal, for each of the one or more LD signals presently received. The computer 43 then collects the pseudoranges measured at two or more selected (distinct and spaced apart) observation times and uses software that is temporarily or permanently stored in a computer memory 45 to perform the analysis discussed in the preceding development, using a computer CPU 45. Optionally, the computer 43 includes a visually perceptible or audibly perceptible display 47 that displays the initial location coordinates (x0,y0,z0) or one or more sets of the changing location coordinates (x0+Δx0'(t), y0+Δy0'(t), z0+Δz0'(t)) for the receiver, either graphically or in an alphanumeric format.

The LD signal sources 15A, 15B, 15C, 15D in FIG. 1 may be GPS satellites or GLONASS satellites, which systems are discussed in U.S. Pat. No. 5,563,917, issued to Sheynblat and incorporated by reference herein. Alternatively, these LD signal sources may be Low Earth Orbit (LEO) satellites, such as the Motorola Iridium system of approximately 66 satellites that follow orbits that are usually no more than about 2000 kilometers above the Earth's surface. Signals from satellites that are all geosynchronous cannot be used here, because the coordinate difference between a ground-based LD apparatus and a given satellite will change little or not at all with time. However, one or two LD signals from geosynchronous satellites might be used here (by setting ω=0 formally for such a satellite) if the remaining LD signals are received from non-geosynchronous satellites whose locations relative to the LD signal apparatus change substantially with time.

I claim:

1. A method for determining the location of a point on a revolving body, the method comprising the steps of:

receiving location determination (LD) signals, at a user receiver located at a selected point on a revolving body, from a satellite that revolves around the revolving body in a non-geosynchronous orbit with known orbit parameters, at N selected, spaced apart sampling times (N≧2);

determining a pseudorange value between the selected point and the satellite at each of the N selected times, using the LD signals;

processing the pseudorange values to produce at least one linear relation relating location fix coordinates for the selected point that takes account of the revolutions of the body and of the satellite relative to each other between at least two sampling times; and using the at least one linear relation together with at least one pseudorange value to produce a nonlinear relation relating the location fix coordinates from which the location fix coordinates can be calculated without iteration and without approximation.

2. The method of claim 1, wherein said step of processing said pseudorange values to produce said at least one linear relation relating location fix coordinates for said LD station comprises the steps of:

forming a first difference between a selected first pseudorange value and a location fix coordinate representing clock error associated with an LD signal receiver located at said selected point;

forming a second difference between a selected second pseudorange value and a location fix coordinate representing clock error associated with an LD signal receiver located at said selected point;

forming a difference of squares between the first difference and the second difference; and identifying terms that are linearly proportional to each of said location fix coordinates for said selected point in the difference of the squares.

3. The method of claim 1, wherein said step of processing the pseudorange values to obtain said at least one linear relation comprises the steps of:

measuring a pseudorange value $PR(t_n;t0;j;user)$ associated with an LD signal transmitted by said satellite, numbered j, and received said user receiver at said selected time $t=t_n$, where the pseudorange value for an LD signal received from said satellite at a time $t=t_n$ is represented approximately by a pseudorange equation of the form $$PR(t_n;t0;j;\text{user})=b+\{(x_s(t_{s,n};j)-x(t_n))^2+(y_s(t_{s,n};j)-y(t_n))^2+(z_s(t_{s,n};j)-z(t_n))^2\}^{1/2},$$

where b=c·Δt is a length equivalent of a clock error associated with an LD signal receiver located at said selected point, c is a velocity of propagation of light, $(x_s(t_{s,n};j),y_s(t_{s,n};j),z_s(t_{s,n};j))$ are the location coordinates of a satellite number j at a time $t=t_{s,n}$ that transmits an LD signal that is received by the user at the time $t=t_n$, $(x(t_n),y(t_n),z(t_n))$ are the location coordinates of the user to be determined at the time $t=t_n$, and the measured pseudorange $PR(t_n;t0;j;user)$ is compensated for at least one of (i) time delay for propagation of an LD signal in the ionosphere, (ii) time delay for LD signal propagation in the troposphere, (iii) clock error associated with an LD signal source on said satellite number j, (iv) receiver noise associated with an LD signal source on said satellite number j, (v) receiver noise associated with said user receiver that receives the LD signals; and (vi) one or more errors produced by multipath LD signals received by said user receiver that receives the LD signals;

forming a squared quantity $PR(t_n;t0;j;user)-b$ for said satellite number j and for each of at least two distinct times $t=t_n$ and $t=t_m$, where the user location coordinates $(x(t_n),y(t_n),z(t_n))$ and $(x(t_m),y(t_m),z(t_m))$ at the two distinct times are substantially the same; and forming a formal difference of the squared quantities $PR(t_n;t0;j;user)-b$ and $PR(t_m;t0;j;user)-b$ of the form $$(PR(t_m;t0;j;\text{user})-b)^2 - (PR(t_n;t0;j;\text{user})-b)^2 =$$
$$PR(t_m;t0;j)^2 - PR(t_n;t0;j)^2 - 2b\{PR(t_m;t0;j)-PR(t_n;t0;j)\} =$$
$$Amn + Bmn \cdot b = Cmn + Dmn \cdot x(t_n) + Emn \cdot y(t_n) + Fmn \cdot z(t_n),$$

where the quantities Amn, Bmn, Cmn, Dmn, Emn and Fmn are numerically determinable from said known orbit parameters of said satellite number j and from the measured pseudorange values at the time $t=t_n$ and $t=t_m$.

4. The method of claim 3, wherein said step of using said at least one linear relation together with one pseudorange value to produce said nonlinear relation relating said location fix coordinates $(x(t_n),y(t_n),z(t_n)b(t_n))$ comprises the steps of:

forming said squared quantity $$\{PR(t_n;t0;j;\text{user})-b\}2=(x_s(t_{s,n};j)-x(t_n))^2+(y_s(t_{s,n},j)-y(t_n))^2+(z_s(t_{s,n};j)-z(t_n))^2;$$

using said at least one linear relation determined in claim 3 to express each of a first, a second and a third of said location fix coordinates in terms of a fourth of said location fix coordinates in said squared quantity to obtain an equation that is at most quadratic in the fourth of said location fix coordinates; and obtaining a numerical value of a solution of the equation that is at most quadratic in the fourth of said location fix coordinates.

5. The method of claim 4, further comprising the step of substituting said numerical value of said solution of said equation that is at most quadratic in said fourth of said location fix coordinates in said at least one linear relation determined in claim 3 to determine a numerical value of at least one of said first, said second and said third of said location fix coordinates.

6. A method for determining the location of a point on a revolving body, the method comprising the steps of:

receiving location determination (LD) signals, at a user receiver located at a selected point on a revolving body, from a first satellite that rotates around the revolving body in a non-geosynchronous orbit with known orbit parameters, at N selected, spaced apart sampling times, and from a second satellite that revolves around the revolving body in an orbit with known orbit parameters, at M-N selected, spaced apart sampling times, with $1 \leq N < M \leq 4$;

determining at least one pseudorange value between the selected point and the first satellite at each of the N selected times, using the LD signals;

determining at least one pseudorange value between the selected point and the second satellite at each of the M selected times, using the LD signals;

processing the pseudorange values to produce at least one linear relation relating location fix coordinates for the selected point that takes account of the revolutions of the body and of the satellite relative to each other between at least two sampling times; and using the at least one linear relation together with one pseudorange value to produce a nonlinear relation relating the location fix coordinates from which the location fix coordinates can be calculated without iteration or approximation.

7. The method of claim 6, wherein said step of processing said pseudorange values to produce said at least one linear relation relating location fix coordinates for said LD station comprises the steps of:

forming a first difference between a selected first pseudorange value, measured from said first satellite, and a location fix coordinate representing clock error associated with an LD signal receiver located at said selected point;

forming a second difference between a selected second pseudorange value, measured from said second satellite, and a location fix coordinate representing clock error associated with an LD signal receiver located at said selected point;

forming a difference of squares between the first difference and the second difference; and identifying terms that are linearly proportional to each of said location fix coordinates for said LD station in the difference of the squares.

8. The method of claim 6, wherein said step of processing said pseudorange values to produce said at least one linear relation relating location fix coordinates for said LD station comprises the steps of:

forming a first difference between a selected first pseudorange value, measured from said first satellite, and a location fix coordinate representing clock error associated with an LD signal receiver located at said selected point;

forming a second difference between a selected second pseudorange value, measured from said first satellite and a location fix coordinate representing clock error associated with an LD signal receiver located at said selected point;

forming a difference of squares between the first difference and the second difference; and identifying terms that are linearly proportional to each of said location fix coordinates for said selected point in the difference of the squares.

9. The method of claim 6, wherein said step of processing said pseudorange values to produce said at least one linear relation relating location fix coordinates for said LD station comprises the steps of:

forming a first difference between a selected first pseudorange value, measured from said second satellite, and a location fix coordinate representing clock error associated with an LD signal receiver located at said selected point;

forming a second difference between a selected second pseudorange value, measured from said second satellite and a location fix coordinate representing clock error associated with an LD signal receiver located at said selected point;

forming a difference of squares between the first difference and the second difference; and identifying terms that are linearly proportional to each of said location fix coordinates for said LD station in the difference of the squares.

10. The method of claim 6, further comprising the step of choosing said integer M=2 and choosing said integer N=1.

11. The method of claim 6, further comprising the step of choosing said integer M=3 and choosing said integer N to be 1 or 2.

12. The method of claim 6, further comprising the step of choosing said integer M=3 and choosing said integer N to be 1, 2 or 3.

13. The method of claim 6, further comprising the step of selecting said second satellite to be non-geosynchronous.

14. The method of claim 6, further comprising the step of selecting said second satellite to be geosynchronous.

15. Apparatus for determining the location of a point on a revolving body, the apparatus comprising a computer that analyzes location determination (LD) signals, received at a user receiver located at a selected point on a revolving body, from a satellite, which revolves around the revolving body in a non-geosynchronous orbit with known orbit parameters, at N distinct selected times (N≧2), and that determines a pseudorange value between the selected point and the satellite at each of the N selected times, using the LD signals, where the computer is programmed:

to process the pseudorange values to produce at least one linear relation relating location fix coordinates for the LD station that takes account of the revolutions of the body and of the satellite relative to each other between at least two sampling times; and to use the at least one linear relation together with one pseudorange value to produce a nonlinear relation relating the location fix coordinates from which the location fix coordinates can be calculated without iteration or approximation.

16. The apparatus of claim 15, wherein said computer is further programmed:

to form a first difference between a selected first pseudorange value and a location fix coordinate representing clock error associated with an LD signal receiver located at said selected point;

to form a second difference between a selected second pseudorange value and a location fix coordinate representing clock error associated with an LD signal receiver located at said selected point;

to form a difference of squares between the first difference and the second difference; and to identify terms that are linearly proportional to each of said location fix coordinates for said selected point in the difference of the squares.

17. The apparatus of claim 15, wherein said computer is programmed to process said pseudorange values to obtain said at least one linear relation by:

obtaining a measured pseudorange value $PR(t_n;t0,j;user)$ associated with an LD signal transmitted by said satellite, numbered j, and received said user receiver at said selected time $t=t_n$, where the pseudorange value for an LD signal received from said satellite at a time $t=t_n$ is represented approximately by a pseudorange equation of the form $$PR(t_n;t0;j;user)=b+\{(x_s(t_{s,n};j)-x(t_n))^2+(y_s(t_{s,n};j)-y(t_n))^2+(z_s(t_{s,n};j)-z(t_n))^2\}^{1/2},$$

where $b=c \cdot \Delta t$ is a length equivalent of a clock error associated with an LD signal receiver located at said selected point, c is a velocity of propagation of light, $(x_s(t_{s,n};j),y_s(t_{s,n};j),z_s(t_{s,n};j))$ are the location coordinates of a satellite number j at a time $t=t_{s,n}$ that transmits an LD signal that is received by the user at the time $t=t_n$, $(x(t_n),y(t_n),z(t_n))$ are the location coordinates of the user to be determined at the time $t=t_n$, and the measured pseudorange $PR(t_n;t0;j;user)$ is compensated for at least one of (i) time delay for propagation of an LD signal in the ionosphere, (ii) time delay for LD signal propagation in the troposphere, (iii) clock error associated with an LD signal source on said satellite number j, (iv) receiver noise associated with an LD signal source on said satellite number j, (v) receiver noise associated with said user receiver that receives the LD signals; and (vi) one or more errors produced by multipath LD signals received by said user receiver that receives the LD signals;

forming a squared quantity $PR(t_n;t0;j;user)-b$ for said satellite number j and for each of at least two distinct times $t=t_n$ and $t=t_m$, where the user location coordinates $(x(t_n),y(t_n),z(t_n))$ and $(x(t_m),y(t_m),z(t_m))$ at the two distinct times are substantially the same; and forming a formal difference of the squared quantities $PR(t_n;t0;j;user)-b$ and $PR(t_m;t0;j;user)-b$ of the form $$(PR(t_m; t0; j; \text{user}) - b)^2 - (PR(t_n; t0; j; \text{user}) - b)^2 =$$
$$PR(t_m; t0; j)^2 - PR(t_n;t0; j)^2 - 2b\{PR(t_m; t0; j) - PR(t_n; t0; j)\} =$$
$$Amn + Bmn \cdot b = Cmn + Dmn \cdot x(t_n) + Emn \cdot y(t_n) + Fmn \cdot z(t_n),$$

where the quantities Amn, Bmn, Cmn, Dmn, Emn and Fmn are numerically determinable from said known orbit parameters of said satellite number j and from the measured pseudorange values at the time $t=t_n$ and $t=t_m$.

18. The apparatus of claim 17, wherein said computer is programmed to use said at least one linear relation together with one pseudorange value to produce said nonlinear relation relating said location fix coordinates $(x(t_n),y(t_n),z(t_n)b(t_n))$ by:

forming said squared quantity $$PR(t_n;t0;j;user)-b\}2=(x_s(t_{s,n};j)-x(t_n))^2+(y_s(t_{s,n};j)-y(t_n))^2+(z_s(t_{s,n};j)-z(t_n))^2;$$

using said at least one linear relation determined in claim 3 to express each of a first, a second and a third of said location fix coordinates in terms of a fourth of said location fix coordinates in said squared quantity to obtain an equation that is at most quadratic in the fourth of said location fix coordinates; and obtaining a numerical value of a solution of the equation that is at most quadratic in the fourth of said location fix coordinates.

19. The apparatus of claim 17, wherein said computer is further programmed to substitute said numerical value of said solution of said equation that is at most quadratic in said fourth of said location fix coordinates in said at least one linear relation determined in claim 13 to determine a numerical value of at least one of said first, said second and said third of said location fix coordinates.

20. Apparatus for determining the location of a point on a revolving body, the apparatus comprising a computer that analyzes location determination (LD) signals, received at a user receiver located at a selected point on a revolving body, from a first satellite that revolves around the revolving body in a non-geosynchronous orbit with known orbit parameters, at N distinct selected times, and from a second satellite that revolves around the revolving body in an orbit with known orbit parameters, at M-N distinct selected times, with $1 \leq N<M \leq 4$, that determines a pseudorange value between the selected point and the first satellite at each of the N selected times, and that determines a pseudorange value between the selected point and the second satellite at each of the M-N selected times, using the LD signals, where the computer is programmed:

to process the pseudorange values to produce at least one linear relation relating location fix coordinates for the selected point that takes account of the rotations of the body and at least one of the first and second satellites relative to each other between at least two sampling times; and to use the at least one linear relation together with one pseudorange value to produce a nonlinear relation relating the location fix coordinates from which the location fix coordinates can be calculated without iteration or approximation.

21. The apparatus of claim 20, wherein said computer is further programmed:

to form a first difference between a selected first pseudorange value, measured from said first satellite, and a location fix coordinate representing clock error associated with an LD signal receiver located at said selected point;

to form a second difference between a selected second pseudorange value, measured from said second satellite, and a location fix coordinate representing clock error associated with an LD signal receiver located at said selected point;

to form a difference of squares between the first difference and the second difference; and to identify terms that are linearly proportional to each of said location fix coordinates for said LD station in the difference of the squares.

22. The apparatus of claim 20, wherein said computer is further programmed:

to form a first difference between a selected first pseudorange value, measured from said first satellite, and a location fix coordinate representing clock error associated with an LD signal receiver located at said selected point;

to form a second difference between a selected second pseudorange value, measured from said first satellite and a location fix coordinate representing clock error associated with an LD signal receiver located at said selected point;

to form a difference of squares between the first difference and the second difference; and to identify terms that are linearly proportional to each of said location fix coordinates for said selected point in the difference of the squares.

23. The apparatus of claim 20, wherein said computer is further programmed:

to form a first difference between a selected first pseudorange value, measured from said second satellite, and a location fix coordinate representing clock error associated with an LD signal receiver located at said selected point;

to form a second difference between a selected second pseudorange value, measured from said second satellite and a location fix coordinate representing clock error associated with an LD signal receiver located at said selected point;

to form a difference of squares between the first difference and the second difference; and to identify terms that are linearly proportional to each of said location fix coordinates for said LD station in the difference of the squares.

24. The apparatus of claim 20, wherein said integer M=2 and said integer N=1.

25. The apparatus of claim 20, wherein said integer M=3 and said integer N is 1 or 2.

26. The apparatus of claim 20, wherein said integer M=3 and said integer N is 1, 2 or 3.

27. The apparatus of claim 20, wherein said second satellite is non-geosynchronous.

28. The apparatus of claim 20, wherein said second satellite is geosynchronous.

* * * * *